(12) United States Patent
Freeman et al.

(10) Patent No.: US 11,403,498 B2
(45) Date of Patent: Aug. 2, 2022

(54) METHOD FOR CLASSIFYING A CAPTURE TAKEN BY A SENSOR

(71) Applicant: APTIV TECHNOLOGIES LIMITED, St. Michael (BB)

(72) Inventors: Ido Freeman, Dusseldorf (DE); Klaus Friedrichs, Dortmund (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 289 days.

(21) Appl. No.: 16/735,978

(22) Filed: Jan. 7, 2020

(65) Prior Publication Data
US 2020/0226432 A1 Jul. 16, 2020

(30) Foreign Application Priority Data
Jan. 11, 2019 (EP) .................................... 19151486

(51) Int. Cl.
*G06K 9/00* (2022.01)
*G06K 9/62* (2022.01)
*G06N 3/04* (2006.01)
*G06N 3/08* (2006.01)

(52) U.S. Cl.
CPC ......... *G06K 9/6277* (2013.01); *G06N 3/0481* (2013.01); *G06N 3/08* (2013.01)

(58) Field of Classification Search
CPC ............. G06K 9/6277; G06K 9/00718; G06K 9/6268; G06N 3/0481; G06N 3/08; G06N 3/0454; G06T 2207/20182
See application file for complete search history.

(56) References Cited

U.S. PATENT DOCUMENTS

2018/0247194 A1* 8/2018 Plebani .................... G06N 3/08
2019/0147220 A1* 5/2019 McCormac ........ G06K 9/00208
382/103

OTHER PUBLICATIONS

Deep Feedforward Networks Lecture slides for Chapter 6 of Deep Learning www.deeplearningbook.org (Year: 2016).*
(Continued)

*Primary Examiner* — Dhaval V Patel
(74) *Attorney, Agent, or Firm* — Carlson, Gaskey & Olds, P.C.

(57) ABSTRACT

A method for classifying a capture taken by a sensor includes receiving a sequence of a plurality of captures taken by a sensor, each of the captures comprising a plurality of elements; generating, per capture, a plurality of raw probability values, each of the raw probability values being linked to a respective one of a plurality of predetermined classes and indicating the probability that the capture or an element of the capture is associated with the respective class; determining, for a respective one of the captures, a plurality of consolidated probability values in dependence of a plurality of base probability values and a plurality of context probability values, wherein the base probability values represent the raw probability values of the respective capture and the context probability values represent the raw probability values of at least one further capture of the sequence other than the respective capture, the context probability values being normalised according to a normalisation rule; and classifying the respective capture or an element thereof on the basis of the consolidated probability values.

17 Claims, 2 Drawing Sheets

(56) References Cited

OTHER PUBLICATIONS

Extended European Search Report for Application No. EP 19 15 1486 dated Jul. 1, 2019.
Dang Kang et al: "Adaptive Exponential Smoothing for Online Filtering of Pixel Prediction Maps," 2015 IFFF International Conference on Computer Vision (ICCV), IEEE, Dec. 7, 2015, pp. 3209-3217, XP032866672, DOI: 10.1109/ICCV.2015.367 [retrieved on Feb. 17, 2016] *sect.1-3*.
Miksik Ondrej et al.: "Efficient temporal consistency for streaming video scene analysis," 2013 IEEE International Conference on Robotics and Automation (ICRA); May 6-10, 2013; Karlsruhe, Germany, IEEE, US, May 6, 2013, pp. 133-139, XP032506395, ISSN: 1050-4729, DOI: 10.1109/CRA.2013.6630567 ISBN: 978-1-4673-5641-1 [retrieved on Oct. 13, 2013] *sect. I-IV*.

\* cited by examiner

METHOD FOR CLASSIFYING A CAPTURE TAKEN BY A SENSOR

CROSS REFERENCE TO RELATED APPLICATION

This application claims priority to European Patent Application No. 19151486.8 filed on Jan. 11, 2019.

BACKGROUND

The invention relates to a method for classifying a capture taken by a sensor. In particular, the capture can be an image taken by an image sensor.

Methods of electronically classifying sensor data have found widespread use. As one example image classification is now used in autonomous applications such as autonomous driving of a vehicle. In such applications not only image data but also data from other sensors, e.g. radar and lidar sensors has to be processed and analysed with respect to its semantic content. For this purpose classification algorithms are used, wherein a complete capture and/or individual elements of the capture (e.g., pixels of an image) are automatically assigned to one or more classes.

Since the output of the classification, i.e. the classification result forms a safety-critical basis for the automatic application, e.g., automatic generation of instructions for autonomously driving a car, a high reliability of the classification result is essential.

State-of-the-art classification algorithms usually output probability values, in particular pseudo probability values or confidence values, for each class. An algorithm for image classification for example can output a probability value for each pixel of an image. On the basis of these probability values a decision can then be made which type of object or class a respective pixel represents.

One problem which hinders a high accuracy of the classification is that a single probability value is as such not always very reliable. In order to reduce this problem it has been suggested to analyse the probability values of subsequent captures, which are a part of a sequence such as a video sequence. This approach allows for taking into account temporal dependencies between the probability values of the captures, wherein individual outliers that do not fit to a systematic trend can be excluded or at least reduced with respect to its impact on the classification result. As one example a majority voting scheme has been suggested, wherein the class with the highest number of maximum probability values over a fixed number of captures is chosen as being the correct class. As another option it is possible to normalise the probability values over several captures so as to make them more comparable. However, it has been found that existing approaches are still unsatisfactory in view of obtaining an optimum classification accuracy, or they are too complex.

SUMMARY

It is an underlying object of the invention to improve the reliability of classifying a capture or an element of the capture. The processing complexity should nevertheless be low.

The object underlying the invention is satisfied by the features of the independent claims. Advantageous further developments and aspects of the invention are set forth in the dependent claims.

According to one aspect a method for classifying a capture comprises the following steps:—receiving a sequence of a plurality of captures taken by a sensor, each of the captures comprising a plurality of elements;—generating, per capture of the sequence, a plurality of raw probability values, in particular pseudo raw probability values, each of the raw probability values being linked to a respective one of a plurality of predetermined classes and indicating the probability that the capture or an element of the capture is associated with the respective class;—determining, for a respective one of the captures of the sequence, a plurality of consolidated probability values in dependence of a plurality of base probability values and a plurality of context probability values, wherein the base probability values represent the raw probability values of the respective capture and the context probability values represent the raw probability values of at least one further capture of the sequence other than the respective capture, the context probability values being normalised according to a normalisation rule;—classifying the respective capture on the basis of the consolidated probability values.

In the exemplary case where the capture is formed by an image the classes divide the objects shown in the image in different categories that are predefined by the developer. For example, if road scenes are considered, there can be a class for vehicles, another class for pedestrians, another class for roads and another class for buildings. Since there are four predetermined classes in this example, for each image four probability values, in particular pseudo raw probability values, are generated. The attribute "raw" indicates that the underlying probability value is directly taken as it is without applying any substantial scaling modification such as normalisation. The raw probability value for one of the classes then indicates the (pseudo) probability that the image shows an object from this particular class. The raw probability values can also be denoted as raw confidence values. For example, the raw probability value for the class "vehicle" indicates the probability or confidence that the image shows a vehicle or a portion of a vehicle. Further, it may be provided that the plurality of probability values is generated for each pixel of the input image. The probability value of a given pixel for one of the classes then indicates the probability that the respective pixel is associated with this particular class. In the example given above, the probability value of a given pixel for the class "vehicle" then indicates the probability that the pixel shows a portion of a vehicle.

The classification of the capture is preferably performed by means of a convolutional neural network, which is known to the skilled person in general. Convolutional neural networks are a sort of artificial neural networks designed to mimic the human visual processing system from the eye to the visual cortex. They are made of an arbitrary number of consecutive layers which are trained together to fulfil the visual task of object classification. Each layer of the convolutional neural network learns to recognise features which are relevant to the specific task in an increasing complexity. The final layer of the convolutional neural network outputs an array of pixels where an individual probability value for each class is assigned to each pixel.

Although convolutional neural networks are preferably used for classifying the captures it is emphasised that other means of classification can also be used provided that they are adapted to generate a plurality of raw probability values per capture or each element thereof, as explained above.

One aspect of the described method for classifying a capture is that consolidated probability values are determined. The attribute "consolidated" means that the uncertainty associated with the raw probability values is reduced, i.e. consolidated. It is generally expected that the consolidated probability values provide for an improved classification accuracy.

The consolidated probability values are determined on the basis of two different groups of probability values, namely the base probability values and the context probability values. The base probability values generally represent the raw probability values of the respective capture for which the consolidated probability values are determined. In one example, the base probability values are formed by the raw probability values of the respective capture. As noted above, the raw probability values can also be denoted as raw confidence values. The base probability values can also be denoted as base confidence values. Likewise, the context probability values can be denoted as context confidence values and the consolidated probability values can be denoted as consolidated confidence values. It is understood that the term "probability" does not necessarily require a sum equal to one of all probability values related to their definition.

The context probability values generally represent the raw probability values of at least one further capture of the sequence. The further capture can be any other capture of the sequence except the respective capture (for which the raw probability values are already represented by the base probability values). However, it is preferred that the context probability values represent the raw probability values of a capture which is temporally close to the respective capture. For example the further capture can be a capture adjacent to the respective capture. In particular, the further capture is a capture from the sequence which immediately precedes the respective capture. In view of a temporal sequence this means that the further capture represents a past capture, i.e. the "history" or "historic context" of the respective capture.

In contrast to the raw probability values the context probability values are normalised, i.e. the context probability values are transformed to a predefined scale or range. For this purpose a normalisation rule is applied, which is preferably predetermined but can also be adaptive. The application of the normalisation rule in view of the context probability values allows for controlling the influence of the underlying raw probability values on the resulting consolidated probability values. This is because the raw probability values of the context probability values have a predefined scale or range (i.e. predetermined "yardstick"), whereas the raw probability values of the base probability values have not. In more simple terms, the raw probability values of the "base capture" are not normalised, i.e. they remain "raw", and the raw probability values of the "context capture" are normalised. In this way, the overall classification accuracy is significantly improved.

It is understood that the raw probability values do not obey a predefined scale (or range) but can in principal take on any number, i.e. in general between the minimum value and the maximum value. For this reason they can generally also be denoted as pseudo raw probability values or raw confidence values. In practice, the raw probability values usually tend to fall into a certain range of values and/or they obey a distribution, e.g., Gaussian distribution. The range or specific form of the distribution is however unknown. Nevertheless, it is possible to make a rough assumption of the expected range and/or distribution and to adapt the predefined scale (or range) for the normalisation in dependence of the expected range and/or distribution (e.g., one or more parameters which characterise the shape of the distribution). For example, the predefined range can be smaller than the expected range of the raw probability values. In particular, the predefined range can have a maximum value that is smaller than the maximum expected value of the raw probability values. This ensures that high probability values of the respective capture will be strong relative to a maximum probability value of the other capture. On the other hand smaller values of the respective capture may be weakened because they will not "benefit" from a normalisation. These effects provide for an adaptive treatment of the probability values between different captures. The raw probability values of the respective capture with a strong deviation from the predefined scale are privileged. In these cases the raw probability values can be assumed to have a high certainty of indicating the correct class.

In one embodiment the consolidated probability values are determined recursively with respect to the captures of the sequence. This allows for a high efficiency of the method, wherein the consolidated probability values of one capture are used for determining the consolidated probability values of another capture. In this way, the history of the sequence can be propagated in a very compact way. A recursive depth of one capture is preferred, i.e. the consolidated probability values of the respective capture are based on the consolidated probability values of only one further capture excluding the respective capture. It is understood that the consolidated probability values of other further captures can nevertheless influence the consolidated probability values of the respective capture, namely through the consolidated probability values of the "only one further capture". This is due to the recursive nature of information propagation. It is understood that due to the recursive definition of the consolidated probability values these probability values can generally be denoted as context probability values.

In a further embodiment the context probability values used for determining the consolidated probability values for the respective capture are formed by the consolidated probability values being determined for the further capture. The consolidated probability values are therefore reused between the captures, thereby realising a recursive determination of the consolidated probability values. For saving storage resources it is preferred that the consolidated probability of only one further capture are used for determining the consolidated probability values of the respective capture. As also indicated in the previous paragraph consolidated probability values of other further captures can still influence the result for the respective capture due to the recursive processing. Therefore, the use of consolidated probability values of "only one further capture" is understood in a technical sense of processing and not in the sense of excluding information which is encoded in the consolidated probability values of the "only one further capture".

Preferably, the sequence of captures represents a temporal sequence, wherein at least some of the captures of the sequence including the respective capture and the further capture correspond to different time instances. In particular, the further capture corresponds to a first time instance and the respective capture corresponds to a second time instance, the first time instance being before the second time instance. This is to say that the further capture or captures represent a history of the sequence, which is used in order to enable processing of the method in real time. However, it is also possible to take the context probability values from a future capture, which is useful if at least some captures can be acquired before determining the consolidated probability values.

In a further embodiment the consolidated probability values are determined by merging the base probability values and the context probability values according to a merging rule. This means that the base probability values and the context probability values are fused together, i.e. mathematically combined so as to yield the consolidated probability values representing both groups of probability values. The information of the raw probability values of at least two different captures is therefore put together in one set of probability values. In principle, any desired mathematical operation can be used for merging the probability values. As already indicated above the merged new set of probability values is expected to provide a higher classification accuracy.

The merging rule preferably defines that the base probability values and the context probability values are added per class of the underlying raw probability values. This means that only the probability values sharing the same class are added to each other. For example, a base probability value that is associated with a raw probability value being linked to class A is added to a context probability value that is associated with a raw probability value being linked to the same class A. It is thus ensured that the semantic structure of the probability values is maintained and no modifications in the overall classification approach are necessary. It is understood that the probability values can be merged per class also by using another mathematical operation.

The merging rule can further define that the merged probability values are weighted with a first weighting parameter. This is useful for encoding a desired processing condition. For example, if there is a-priori information that the consolidated probability values of a given set of captures is generally more reliable than the consolidated probability values of another set of captures then this can be taken into account directly in the probability values. As another advantage the first weighting parameter can be used to control the influence of the raw probability values of the further capture on the consolidated probability values of the respective capture (when adopting recursive determination of the consolidated probability values). The higher the weighting parameter the more weight is put on the history of the probability values. This applies greater smoothing on the probability values of the respective capture.

As already indicated further above it can be provided that the base probability values are formed by the raw probability values of the respective capture, which is very efficient. However, it is in some cases desirable to determine the base probability values as a function of the raw probability values, wherein said raw probability values are weighted with a second weighting parameter, which can for example be in the range of [0, 1], i.e. between zero and one. For similar reasons as explained in connection with the consolidated probability values it is therefore possible to apply a predetermined weighting to the base probability values. For example, very uncertain base probability values can be shrinked by applying a second weighting parameter with a value smaller than one.

In a further embodiment the context probability values are weighted with a third weighting parameter, the third weighting parameter preferably being a complement of the second weighting parameter. For example, the third weighting parameter can be one minus the second weighting parameter. This allows for a beneficial weighting adjustment, which takes into account both groups of probability values.

In general, each or all of the weighting parameters described above, i.e. the first, second and/or third weighting parameter can be set in dependence of the expected range or distribution of the generated raw probability values. In addition or alternatively the weighting parameters can be chosen in dependence of the number of the respective capture so as to make the weighting parameters adaptive with respect to the captures of the sequence. Each of these measures further improves the classification accuracy without causing substantial computational cost.

The normalisation rule can comprise an exponential normalisation, which has been found to be very effective in view of improving the classification accuracy. In particular, a so-called softmax normalisation can be used, which is a type of exponential normalisation known from the art.

The exponential normalisation is preferably defined as the exponential function of a respective one of the context probability values divided by the sum of the exponential functions of at least some, preferably all, of the context probability values. For example, let there be two context probability values $p1$ and $p2$. The exponentially normalised version of the first value $p1$ can then be expressed as $p1'=\exp(p1)/(\exp(p1)+\exp(p2))$, wherein $\exp(\ )$ denotes the exponential function. Likewise, the exponentially normalised version of the second value $p2$ can be expressed as $p2'=\exp(p2)/(\exp(p1)+\exp(p2))$.

In another embodiment the base probability values are not normalised. This is to say that the base probability values are not normalised according to the normalisation rule that is applied to the context probability values. Therefore, the base probability values can also be denoted as the raw base probability values because they represent raw probability values without being affected by a normalisation. Preferably, the base probability values are also not scaled in another way although this is possible, as indicated further above in in view of the weighting factor.

Having regard to the semantic class structure of the raw probability values it is preferred that the consolidated probability values, the base probability values and/or the context probability values are linked to the same classes as the raw probability values. In other words the number and the class assignment of all or at least some of the probability values used within the method are the same over all captures. This simplifies the method and also leads to an increased reliability.

As indicated further above classifying the respective capture on the basis of the consolidated probability values preferably comprises selecting the class being linked to the maximum of the consolidated probability values. In addition, the raw probability values can be generated by using a neural network, in particular a convolutional neural network. A convolutional neural network can for example be used when the capture is formed by an image, which can have two or more dimensions. One-dimensional captures are also possible, for example in the form of sound signals acquired by a microphone. Moreover, it is also possible to use a neural network for classification when the captures are acquired by other or more complex sensors, radar or lidar sensors. Captures of these sensors can also be treated as images.

The invention further relates to a computer program comprising instructions, which, when executed on a computer, cause the computer to perform the method according to one of the embodiments described above.

The invention also relates to a storage medium including the instructions of the computer program.

Further, the invention relates to a device for classification of a capture, in particular an image, taken by a sensor, the device being adapted to perform the method according to one of the embodiments described above. The device can comprise an image sensor for taking a video sequence, wherein the device is adapted to classify individual image frames of the video sequences by means of the method. The device can be configured to influence the operation of an autonomous application such as autonomous driving of a vehicle. For example, the vehicle can be controlled autonomously in dependence of the classification of one or more captures which represent the vicinity of the car. In this example, the image sensor is mounted on the car and is adapted to take video sequences of the vicinity of the car. Likewise, other sensors, e.g. radar and/or lidar can be mounted on the car, wherein the corresponding captures are classified accordingly. The classification result can then also be used to influence the autonomous application. The classification can be performed by using a neural network, in particular a convolutional neural network.

BRIEF DESCRIPTION OF THE DRAWINGS

The invention will be described in more detail in the following and in an exemplary manner with reference to the drawings.

DETAILED DESCRIPTION

Figure 1:
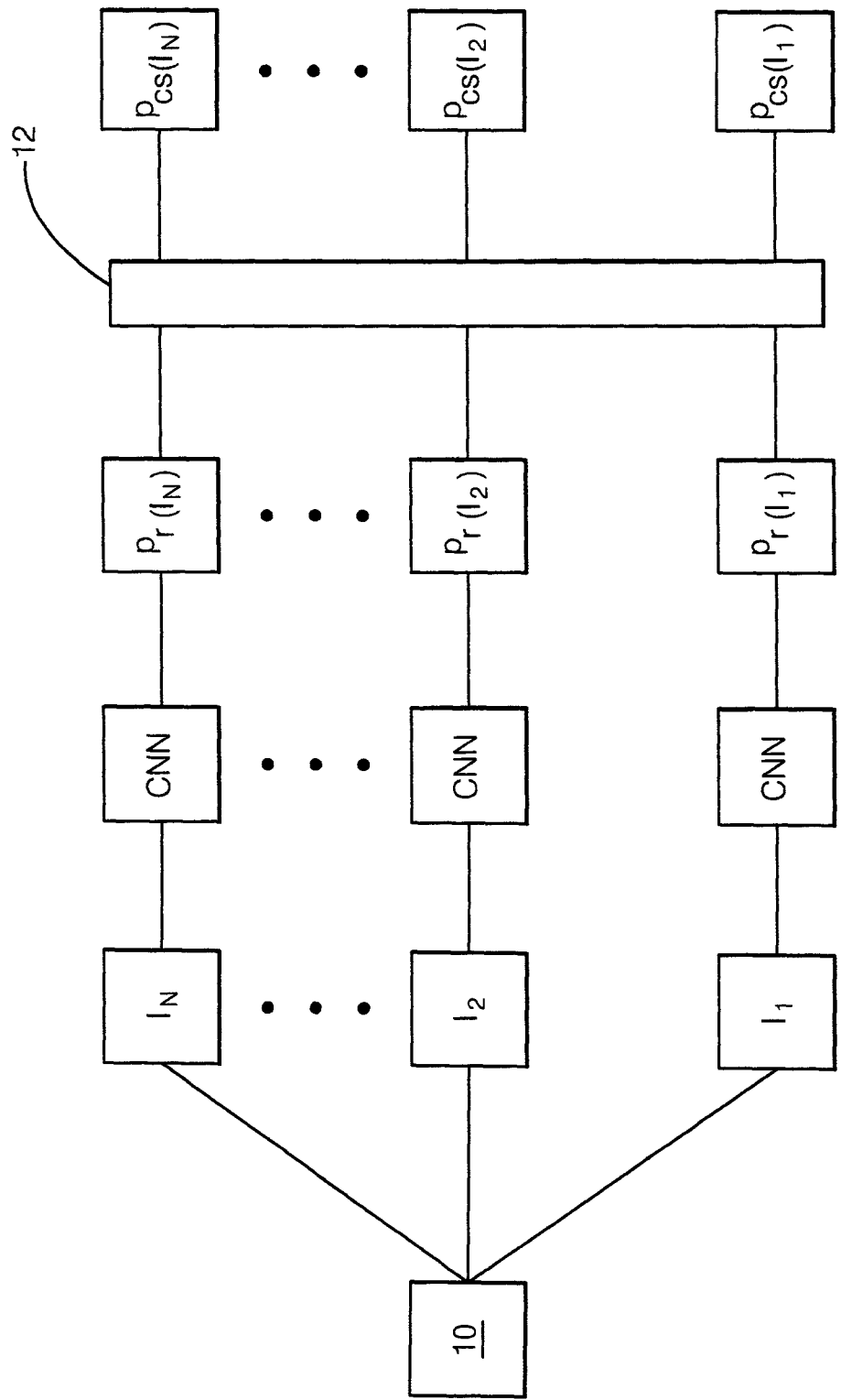
FIG. 1 a schematic representation of aspects of an exemplary embodiment of a method for image classification.

FIG. 1 schematically illustrates a method for image classification. The method starts with taking a plurality of images, i.e. $I_1, I_2, \ldots, I_N$, i.e. $I_n$, n{1, 2, ... N} by means of a camera 10. Images are one type of capture taken by a sensor.

The camera 10 is mounted on a vehicle and takes the images $I_n$ of the area in front of the vehicle. Alternatively, the camera 10 may be directed to an area in the rear and/or at a side of the vehicle.

The images $I_n$ together form a video sequence which is processed further by means of a computer program. The program, which is preferably implemented in a device, first performs classification of the images $I_n$ by means of a convolutional neural network (CNN) and generates output images (not shown) which contain raw probability values pr for each of the images $I_n$, i.e. $p_r(I_n)$ and/or for each pixel of the images $I_n$. Each probability value indicates the probability that the respective image or pixel is associated with one of a plurality of predetermined classes.

For classifying the images $I_n$ the computer program includes a convolutional neural network CNN that consists of several convolutional layers. The different convolutional layers are trained to detect different patterns in the images $I_n$. The final layer of the convolutional neural network CNN outputs the individual probability values $p_r(I_n)$ that are assigned to each image $I_n$ and, in particular, to each pixel. Each probability value indicates the probability that the respective image $I_n$ (or pixel) is associated with one of a plurality of predetermined classes (or object categories). The classes divide the objects shown in the images $I_n$ in different categories that can be typically found in road scenes. For example, there can be a class for vehicles, another class for pedestrians, another class for roads, another class for buildings etc. The probability value of a given image $I_n$ (or pixel) for one of the classes then indicates the probability that the respective image $I_n$ (or pixel) shows an object from this particular class. It is also possible in general that a probability value of a given image $I_n$ indicates the presence of a predefined condition in the image, for example the presence of light emitted by a vehicle.

In one example, there are the following classes: vehicle, pedestrian, road and building. The raw probability values $p_r(I_n)$ output by the final layer of the convolutional neural network CNN for one of the images $I_n$ are, for example, 0.1, −2, 5, and −5 indicating the probability that this particular image shows a vehicle, a pedestrian, a road and a building, respectively. It is understood that the raw probability values do not have to sum up equal to 1.

For each image $I_n$ consolidated probability values $p_{cs}(I_n)$ are then determined on the basis of raw probability values $p_r(I_n)$ of at least two different images, cf. step 12 in FIG. 1. In general, the consolidated probability values $p_{cs}(I_n)$ are determined in dependence of base probability values $p_b(I_n)$ and context probability values $p_{cx}(I_n)$, both for each image, wherein the context probability values $p_{cx}(I_n)$ are normalised. This can be expressed as a merging rule in greater detail as follows:

$$p_{cs}(I_n)=p_b(I_n)+sm(p_{cx}(I_n)),$$

wherein sm( ) denotes a normalisation function, which is preferably defined as a softmax normalization. For example, let there be two context probability values p1 and p2, i.e. $p_{cx}(I_n)$=[p1, p2]. The softmax normalised version of the first value p1 can then be expressed as sm(p1)=exp(p1)/(exp (p1)+exp(p2)), wherein exp( ) denotes the exponential function. Likewise, the exponentially normalised version of the second value p2 can be expressed as sm(p2)=exp(p2)/(exp (p1)+exp(p2)). It is understood that the normalisation provides a transformation of the probability to a predefined scale. In case of the softmax normalisation this predefined scale is [0, 1], i.e. the normalised values are all between zero and one. In contrast, the raw probability values cover a bigger range between the minimum and maximum output of the probability values of the CNN. For the exemplary raw probability values outlined above this range is [−5, 5]. Different ranges are possible, for example [−30, 30]. The minimum value and maximum value do not necessarily have the same magnitude and opposite sign. However, for many classifiers this is the case.

The base probability values and the context probability values both represent raw probability values, however from different captures. In one example the base probability values are formed by the raw probability values of the respective capture, i.e. the n-th image. The context probability values represent other raw probability values of at least one further image, in particular of the preceding image n−1. This can generally expressed as:

$$p_{cs}(I_n)=p_r(I_n)+sm(p_r(I_{n-1})),$$

wherein the raw probability values of the n-th image $p_r(I_n)$ form the base probability values $p_b(I_n)$ and the raw probability values of the preceding image (n−1) form the context probability values $p_{bx}(I_n)$ normalised by the function sm( ).

Figure 2:
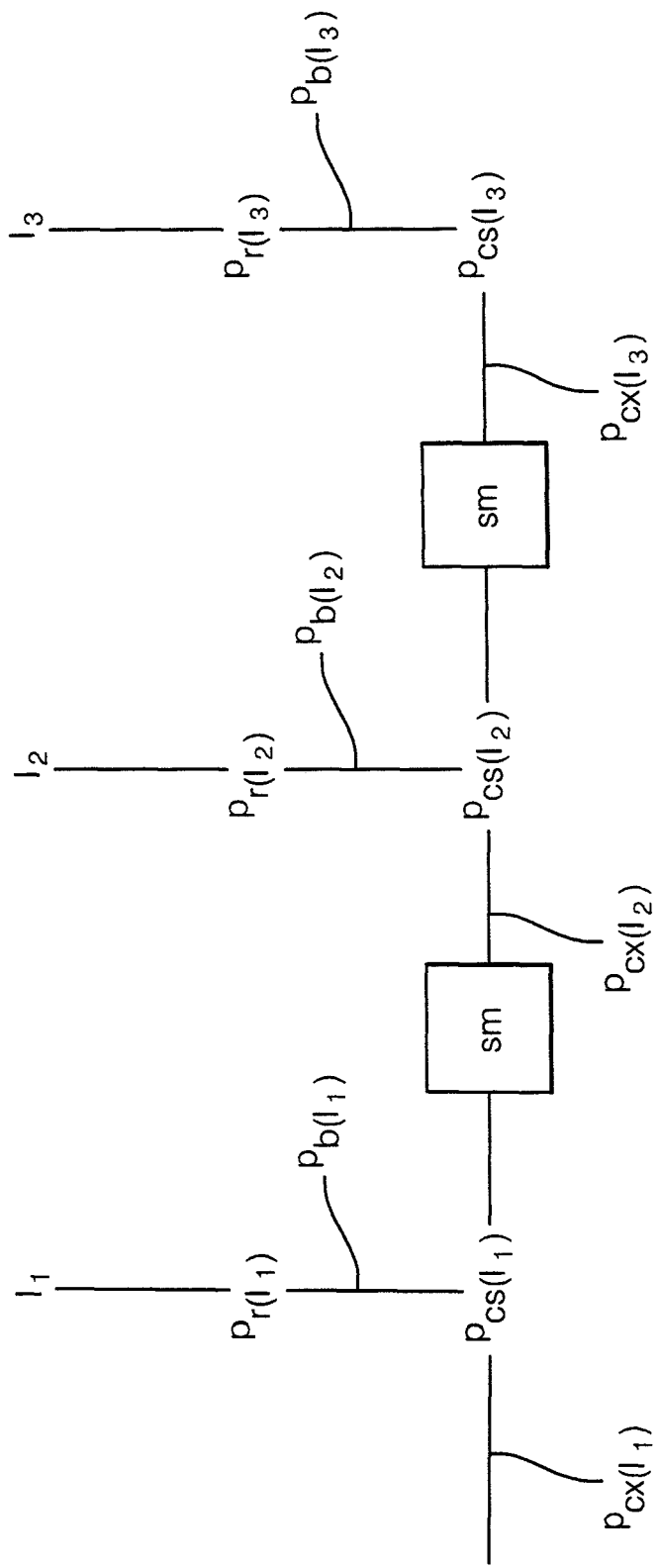
FIG. 2 a schematic representation of an aspect of the method illustrated in FIG. 1.

In another example the consolidated probability values can be determined recursively with respect to the images and the context probability values. This can be expressed as:

$$p_{cs}(I_n)=p_r(I_n)+sm(p_{cs}(I_{n-1})),$$

wherein the raw probability values $p_r(I_n)$ of the current image $I_n$ form the base probability values $p_b(I_n)$ and the consolidated probability values $p_{cs}(I_{n-1})$ of the previous image form the context probability values $p_{cx}(I_n)$) of the current image. The sum of these probability values forms the consolidated probability values of the current image. This is schematically illustrated in FIG. 2 for three images $I_1$, $I_2$, and $I_3$. The context probability values for the first image $I_1$ can be initialized to a suitable value, for example zero.

It is possible to include weighting factors for controlling the influence of the several terms:

$$p_{cs}(I_n) = a \cdot (b \cdot p_r(I_n) + sm(p_{cs}(I_{n-1}))),$$

wherein the base probability values $p_b(I_n) = b \cdot p_r(I_n)$ are formed by the raw probability values of the n-th image multiplied with the factor b. The sum of the base probability values $p_b(I_n)$ and the context probability values $p_{cx}(I_n)) = sm(p_{cs}(I_{n-1}))$ is multiplied with the factor a. In view of the recursive determination of the consolidated probability values, i.e. $p_{cs}(I_n) = f(p_{cs}(I_{n-1}))$, it is understood that as the factor a increases (a>1) the influence of the past images is increased relative to the current image, and vice versa. This is because $p_{cs}(I_n)$ forms a past portion for the next values $p_{cs}(I_{n+1})$. In this regard $p_{cs}(I_n)$ is augmented and therefore becomes more dominant in the sum with the probability values of the next respective image. The factor a can also be regarded as a smoothing parameter.

In another example the following rule can be applied:

$$p_{cs}(I_n) = a' \cdot p_r(I_n) + (1-a') \cdot sm(p_{cs}(I_{n-1}))),$$

where a' is a weighting parameter. At least one or all of the weighting parameters a, b, a' can be dependent on the number of the image in the sequence, i.e. n. The weighting factors can thus be a function of n. In this way, different processing conditions can be taken into account.

An advantage of the merging rules presented herein (i.e. the formulas for determining the consolidated probability values) is that they can be readily incorporated into the training of a neural network, i.e. they are differentiable. In particular, the CNN for classifying the images can be adapted to directly output the consolidated probability values. The weighting parameters can also be part of the training, thus avoiding manual tuning of these parameters.

LIST OF REFERENCE SIGNS 10 camera
12 method step
n image index
$I_n$ n-th image
$p_{cs}$ consolidated probability values
$p_r$ raw probability values
$p_b$ base probability values
$p_{cx}$ context probability values
sm normalisation function
a, a' weighting factor
b weighting factor

The invention claimed is:

1. A method comprising:
generating a plurality of raw probability values for each capture of a sequence of captures taken by a sensor, wherein each of the raw probability values indicates a probability that the capture is associated with a respective class of a plurality of predetermined classes and there is one raw probability value for each of the classes;
determining, for one of the captures, a plurality of base probability values that represent the raw probability values of the one of the captures;
determining a plurality of context probability values that represent probability values of at least one further capture of the sequence other than the one of the captures;
normalising the context probability values according to a normalisation rule;
determining, for the one of the captures, a plurality of consolidated probability values based on the plurality of base probability values and the plurality of normalised context probability values, wherein each consolidated probability value corresponds to a respective one of the predetermined classes; and
classifying the one of the captures into one of the predetermined classes based on the consolidated probability values.

2. The method according to claim 1, wherein the consolidated probability values are determined recursively with respect to the captures of the sequence.

3. The method according to claim 1, wherein the context probability values are either
the raw probability values for the further capture, or
the consolidated probability values for the further capture.

4. The method according to claim 1, wherein
the sequence of captures represents a temporal sequence of captures;
at least some of the captures of the sequence including the one capture and the further capture correspond to different time instances; and
the further capture corresponds to a first time instance and the one capture corresponds to a second time instance after the first time instance.

5. The method according to claim 1, wherein the consolidated probability values are determined by merging the base probability values and the context probability values according to a merging rule.

6. The method according to claim 5, wherein the merging rule defines that the base probability values and the context probability values are added per class of the underlying raw probability values.

7. The method according to claim 5, wherein the merging rule defines that merged probability values are weighted with a first weighting parameter.

8. The method according to claim 7, wherein the base probability values are a function of the raw probability values, said raw probability values being weighted with a second weighting parameter.

9. The method according to claim 8, wherein the context probability values are weighted with a third weighting parameter, said third weighting parameter being a complement of the second weighting parameter.

10. The method according to claim 1, wherein the normalisation rule comprises an exponential softmax normalisation.

11. The method according to claim 10, wherein the exponential normalisation is defined as an exponential function of a respective one of the context probability values divided by a sum of the exponential functions of at least some of the context probability values.

12. The method according to claim 1,
wherein the base probability values are not normalised and/or
wherein the consolidated probability values, the base probability values and/or the context probability values are linked to the same classes as the raw probability values
and/or
wherein classifying the respective capture on the basis of the consolidated probability values comprises selecting the class linked to a maximum of the consolidated probability values.

13. The method according to claim 1, wherein the raw probability values are generated by using a convolutional neural network.

14. The method of claim 1, wherein the sensor comprises a camera and the captures are images captured by the camera.

15. The method of claim 1, wherein the sensor comprises a camera and the captures are pixels of an image.

16. A non-transitory storage medium comprising instructions, which, when executed on a computer, cause the computer to perform the method of claim 1.

17. A device configured to perform the method of claim 1,
- wherein the device comprises an image sensor for taking a video sequence, and wherein the device is configured to classify individual image frames of the video sequence by performing the method of claim 1.

* * * * *